Patented Sept. 25, 1928.

1,685,360

UNITED STATES PATENT OFFICE.

ROBERT BURNS HOFFMAN, OF MONTEREY, CALIFORNIA.

CLEANING COMPOSITION OF MATTER.

No Drawing. Application filed January 26, 1927. Serial No. 163,850.

This invention relates to composition of matter for cleaning and particularly for cleaning silver. According to my invention I may use diatomaceous or infusorial earth with a buffing or polishing agent, such as ferric oxide; or, I may use diatomaceous earth and a liquid, such for example as water. Furthermore, I may use diatomaceous or infusorial earth with a deliquescent substance, such for example as calcium chloride. The deliquescent substance may be used with a diatomaceous earth and ferric oxide mixture, and it may also be used with the diatomaceous earth and liquid mixture mentioned. Water may also be used with the diatomaceous earth, polishing agent and deliquescent substance.

A mixture of infusorial earth, a liquid, such as water, for example, a deliquescent substance, such as calcium chloride for example, a polishing agent, such as ferric oxide, may make a satisfactory polishing composition; to this may be added a cleaning agent such as ammonia and oil of citronella.

When water is used in making the mixture, calcium chlodride tends to prevent the evaporation of water and therefore keeps a moisture in the mixture. The ammonia cuts the grease and the oil of citronella counteracts the odor of ammonia, while the ferric oxide or its equivalent gives a gloss to the silver.

In making a composition of matter of my invention embodying infusorial earth and water, 100 grams of the former may be added to 150 grams of the latter; to this mixture 6 grams of calcium chloride may be added, if desired. To the mixture of infusorial earth and water one gram of ferric oxide may be added with or without 6 grams of calcium chloride. To the mixture of infusorial earth and water one gram of ammonia or other grease-cutting agent may be used; to counteract the odor of ammonia oil of citronella to the amount of one gram may be added to the mixture.

While I have described one embodiment of my invention, modifications thereof may be readily devised without departing from the spirit of my invention, and it is to be understood that such modifications come within the scope of the appended claim.

I claim:

A silver cleaning composition consisting of 100 grams of diatomaceous earth, 150 grams of water, 6 grams of calcium chloride, one gram ferric oxide, one gram ammonia, and one gram of oil of citronella.

ROBERT BURNS HOFFMAN.